(12) United States Patent
Sepulveda

(10) Patent No.: US 9,075,814 B2
(45) Date of Patent: *Jul. 7, 2015

(54) MEMORY DEVICE, ELECTRONIC SYSTEM, AND METHODS ASSOCIATED WITH MODIFYING DATA AND A FILE OF A MEMORY DEVICE

(71) Applicant: Micron Technology, Inc., Boise, ID (US)

(72) Inventor: Frank J. Sepulveda, Phelan, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,845

(22) Filed: Feb. 18, 2014

(65) Prior Publication Data

US 2014/0164445 A1 Jun. 12, 2014

Related U.S. Application Data

(63) Continuation of application No. 13/043,968, filed on Mar. 9, 2011, now Pat. No. 8,655,927, which is a continuation of application No. 11/725,879, filed on Mar. 20, 2007, now Pat. No. 7,917,479.

(51) Int. Cl.
G06F 12/00 (2006.01)
G06F 11/14 (2006.01)
G06F 17/30 (2006.01)

(52) U.S. Cl.
CPC ...... *G06F 17/30138* (2013.01); *G06F 11/1441* (2013.01); *G06F 17/30227* (2013.01); *G06F 17/30218* (2013.01)

(58) Field of Classification Search
None
See application file for complete search history.

(56) References Cited

U.S. PATENT DOCUMENTS

| | | | |
|---|---|---|---|
| 5,592,669 A | 1/1997 | Robinson et al. | |
| 5,630,093 A | 5/1997 | Holzhammer et al. | |
| 5,983,240 A * | 11/1999 | Shoroff et al. | 1/1 |
| 6,192,376 B1 | 2/2001 | Kincaid et al. | |
| 6,275,804 B1 | 8/2001 | Carl et al. | |
| 6,704,852 B2 | 3/2004 | Lai et al. | |
| 6,910,054 B1 | 6/2005 | Herbst et al. | |
| 6,930,503 B2 | 8/2005 | Sher et al. | |
| 6,968,439 B2 | 11/2005 | Wong et al. | |
| 7,062,606 B2 | 6/2006 | Ober et al. | |
| 7,085,908 B2 | 8/2006 | Wong et al. | |
| 7,130,979 B2 | 10/2006 | Wong | |

(Continued)

FOREIGN PATENT DOCUMENTS

EP  444544 A2  5/1997

OTHER PUBLICATIONS

International Search Report for International Application No. PCT/US2008/057461, mailed Nov. 5, 2009, 3 pages.

(Continued)

*Primary Examiner* — Sangwoo Ahn
(74) *Attorney, Agent, or Firm* — TraskBritt

(57) ABSTRACT

A memory device, system and method of editing a file in a non-volatile memory device is described. The memory device includes a controller and a memory array configured to copy an existing first file into a second file during editing and to maintain the first file while applying edits to the second file. When editing is completed, a first cluster pointer of the first file is redirected to point at the first cluster of the second file that has been edited.

20 Claims, 9 Drawing Sheets

(56) References Cited

U.S. PATENT DOCUMENTS

| | | |
|---|---|---|
| 7,139,896 B2 | 11/2006 | Wong |
| 7,162,606 B2 | 1/2007 | Wong et al. |
| 7,536,507 B1 * | 5/2009 | Wagner et al. ............... 711/114 |
| 7,613,738 B2 | 11/2009 | Patel et al. |
| 7,917,479 B2 | 3/2011 | Sepulveda |
| 2004/0210706 A1 | 10/2004 | In et al. |
| 2004/0250172 A1 | 12/2004 | Patel et al. |
| 2005/0055532 A1 | 3/2005 | Yu |
| 2005/0108491 A1 | 5/2005 | Wong et al. |
| 2005/0273648 A1 | 12/2005 | Mambakkam et al. |
| 2006/0015676 A1 | 1/2006 | Oribe et al. |
| 2006/0044934 A1 | 3/2006 | Wong et al. |
| 2006/0047920 A1 | 3/2006 | Moore et al. |
| 2006/0075395 A1 | 4/2006 | Lee et al. |
| 2006/0117072 A1 | 6/2006 | McKenney et al. |
| 2006/0184723 A1 | 8/2006 | Sinclair et al. |
| 2006/0271725 A1 | 11/2006 | Wong |
| 2006/0282644 A1 | 12/2006 | Wong |
| 2007/0002612 A1 | 1/2007 | Chang et al. |
| 2007/0005560 A1 | 1/2007 | Dodge |
| 2007/0299888 A1 | 12/2007 | Thornton et al. |
| 2011/0161613 A1 | 6/2011 | Sepulveda |

OTHER PUBLICATIONS

International Written Opinion for International Application No. PCT/US2008/057461, mailed Nov. 5, 2009, 6 pages.

International Preliminary Report on Patentability for International Application No. PCT/US2008/057461, dated Dec. 1, 2009, 7 pages.

* cited by examiner

MEMORY DEVICE, ELECTRONIC SYSTEM, AND METHODS ASSOCIATED WITH MODIFYING DATA AND A FILE OF A MEMORY DEVICE

CROSS-REFERENCE TO RELATED APPLICATIONS

This application is a continuation of U.S. patent application Ser. No. 13/043,968, filed Mar. 9, 2011, now U.S. Pat. No. 8,655,927, issued Feb. 18, 2014, which is a continuation of U.S. patent application Ser. No. 11/725,879, filed Mar. 20, 2007, now U.S. Pat. No. 7,917,479, issued Mar. 29, 2011, the disclosure of each of which is hereby incorporated herein by this reference in its entirety.

TECHNICAL FIELD

Embodiments of the present invention relate generally to the field of non-volatile memory devices and, more particularly, to protecting file integrity of data stored on a non-volatile memory device.

BACKGROUND

Electronic or computer systems employ multiple memory types, which may be grouped according to volatile and non-volatile capabilities. Non-volatile memory types retain stored data even when no electrical power is being supplied to the electronic system. Electronic systems may include various types of non-volatile memory devices such as disk drives including magnetic drives commonly referred to as "hard drives." Disk drive systems typically excel in the ability to store and retrieve large quantities of data. Hard drive form factors have evolved to include portable removable media such as memory cards, memory sticks, Flash cards and Flash drives. Due to their portable nature, these types of memories include electromechanical interface components that may be timely or untimely disconnected from their host system or otherwise have their power source untimely interrupted. Furthermore, these removable non-volatile memory devices often incorporate data retention technology that is sluggish in writing or programming data to the storage medium. Accordingly, the probability that a power interruption may occur when data is being written to the memory device is significant enough to require attention.

A file allocation table (FAT) is associated with the storage media in order to be able to determine which data was written to the medium, and to be able to determine a place on the medium where the stored data is located. Several different kinds of FAT standards have been developed, including FAT12, FAT16 and FAT32, to address needs of different systems. In a conventional FAT file system, new data or changes to an existing file are written over and/or appended to a previous version of the file when a file is modified. Following writing of the new data or changes, the FAT is updated providing the memory device remains attached and powered. However, a conventional FAT file system is vulnerable to corruption from an interrupted write or programming operation of the memory device resulting from, for example, an intervening power loss such as when the memory device or the power source to the memory device is prematurely disconnected.

Should a power interruption occur after initiation of a write of new data to a file, but before or during the corresponding FAT write operation, the entire file system can be damaged or destroyed. While the likelihood of a complete file system loss is small, there is a large probability of lost data segments configured as cluster chains that may or may not be recoverable following restoration of power to the device. Conventional FAT file systems, by design, are not transaction-safe file systems. The conventional FAT can be corrupted when a write or programming operation is interrupted during a file editing process resulting in corruption of a file or entire loss of some data within the file.

For the reasons stated above, and for other reasons stated below which will become apparent to those of ordinary skill in the art upon reading and understanding the present specification, there is a need in the art for improved non-volatile memory devices.

DETAILED DESCRIPTION

Figure 1:
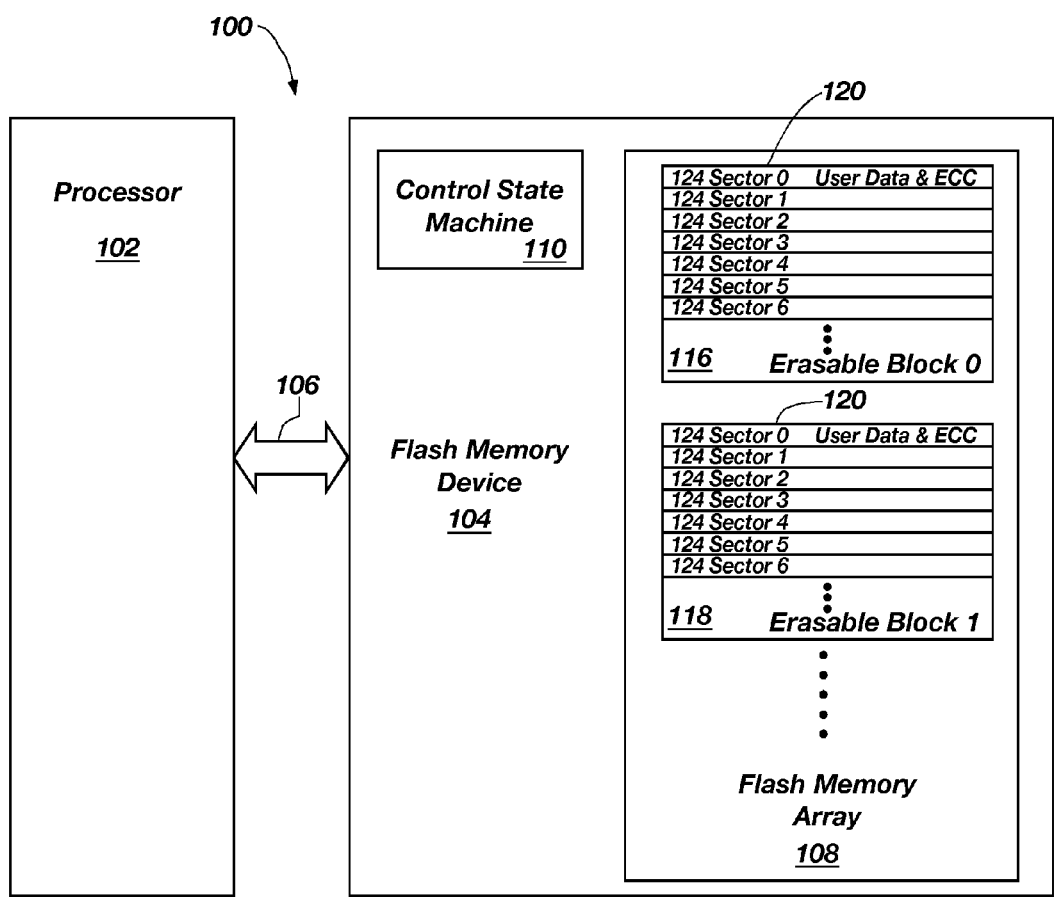
FIG. 1 is a simplified diagram of an embodiment of a system that incorporates a non-volatile memory device, in accordance with embodiments of the present invention.

In the following detailed description, reference is made to the accompanying drawings that form a part hereof and in which is shown by way of illustration, specific embodiments in which the invention may be practiced. These embodiments are described in sufficient detail to enable those skilled in the art to practice the invention, and it is to be understood that other embodiments may be utilized, and that structural, logical and electrical changes may be made without departing from the spirit and scope of the present invention.

Many computer operating systems, such as "DOS" (Disk Operating System), support the physical characteristics of hard drive structures and support file structures based on heads, cylinders and sectors. By way of example and not limitation, a DOS software-based system stores and retrieves data based on these physical attributes. Magnetic hard disk drives operate by storing polarities on magnetic material. This material is able to be rewritten quickly and as often as desired. These characteristics allow DOS to develop a file structure that stores files at a given location, which is updated by a rewrite of that location as information is changed. Essentially all locations in DOS may be viewed as fixed and do not change over the life of the disk drive being used therewith, and are easily updated by rewrites of the smallest supported block of this structure. A sector (of a magnetic disk drive) is the smallest unit of storage that the DOS operating system supports. In particular, a logical block or sector (referred to herein as a logical block) has come to be defined as 512-bytes of information for DOS and most other operating systems in existence.

As an alternative to magnetic hard drive implementations, semiconductor non-volatile memory devices, such as Flash memories, have become ubiquitous. Flash and other non-volatile memory systems that emulate the storage characteristics of hard disk drives are preferably similarly structured to support storage in, by way of example and not limitation, 512-byte blocks along with additional storage for overhead associated with mass storage, such as ECC bits, status flags for the sector or erasable block, and/or redundant bits. In the present invention of Flash memory device implementations, the controller and/or software routines additionally allow the Flash memory device or a memory subsystem of Flash memory devices to appear as a read/write mass storage device (i.e., a magnetic disk) to the host by conforming the interface of the Flash memory device to be compatible with a standard interface for a conventional magnetic hard disk drive. This approach allows the Flash memory device to appear to the operating system as a block read/write mass storage device or disk.

By way of example, at least one such interface has been codified by the Personal Computer Memory Card International Association (PCMCIA), Compact Flash (CF), and Multimedia Card (MMC) standardization committees, which have each promulgated a standard for supporting Flash memory systems or Flash memory "cards" with a hard disk drive protocol. A Flash memory device or Flash memory card (including one or more Flash memory array chips) whose interface meets these standards can be plugged into a host system having a standard DOS or compatible operating system with a Personal Computer Memory Card International Association—Advanced Technology Attachment (PCMCIA-ATA) or standard ATA interface. Other additional Flash memory based mass storage devices of differing low level formats and interfaces also exist, such as Universal Serial Bus (USB) Flash drives. As used herein, "Flash memory" includes various known forms of non-volatile memory including without limitation NAND and NOR based non-volatile memory arrays.

FIG. 1 is a simplified diagram of an embodiment of an electronic system 100 that incorporates a Flash memory device 104, in accordance with the present invention. In the system 100 of FIG. 1, the Flash memory device 104 is coupled to a processor 102 with an address/data bus 106. Internal to the Flash memory device 104, a controller or a control state machine 110 directs internal operation of the Flash memory device 104, including managing the Flash memory array 108. The Flash memory array 108 contains floating gate memory cells arranged in a sequence of erasable blocks 116, 118. Electronic system 100 may comprise, for example, computational and communication devices such as a computer, a cellular telephone, a personal digital assistant, an MP3 player, a digital camera, or other such devices that may find application to editing a stored file.

According to non-volatile memory devices in general, and Flash memory devices in particular, all the cells in an erasable block are generally erased all at once since a memory cell within an erasable block cannot be directly rewritten without first engaging in a block erase operation. The execution of erasable block management is typically under the control of the internal controller or control state machine, an external memory controller, or software driver through a provided abstraction layer allowing the non-volatile device to appear as a freely rewriteable device. Other internal block management features (not shown) include the logical address to physical address translation mapping with the translation layer, the assignment of erased and available erasable blocks for utilization, and scheduling for block erasure the erasable blocks that have been used and closed out. Erasable block management may also allow for load leveling of the internal floating gate memory cells to help prevent write fatigue failure. Write fatigue is where the floating gate memory cell, after repetitive writes and erasures, no longer properly erases and removes charge from the floating gate. Load leveling procedures increase the mean time between failure of the erasable block and non-volatile/Flash memory device as a whole.

Two common types of Flash memory array architectures are the "NAND" and "NOR" architectures. Other types of non-volatile memory include, but are not limited to, Polymer Memory, Ferroelectric Random Access Memory (FeRAM), Ovionics Unified Memory (OUM), Nitride Read Only Memory (NROM), and Magnetoresistive Random Access Memory (MRAM).

In the NOR Flash memory array architecture, the floating gate memory cells of the memory array are arranged in a matrix. The gates of each floating gate memory cell of the array matrix are connected by rows to word select lines (word lines) and their drains are connected to column bit lines. The source of each floating gate memory cell is typically connected to a common source line. The NOR architecture floating gate memory array is accessed by a row decoder activating a row of floating gate memory cells by selecting the word line connected to their gates. The row of selected memory cells then place their stored data values on the column bit lines by flowing a differing current if in a programmed state or not programmed state from the connected source line to the connected column bit lines.

A NAND Flash memory array architecture also arranges its array of floating gate memory cells in a matrix such that the gates of each floating gate memory cell of the array are connected by rows to word lines. However each memory cell is not directly connected to a source line and a column bit line. Instead, the memory cells of the array are arranged together in strings, typically of 8, 16, 32 or more each, where the memory cells in the string are connected together in series, source to drain, between a common source line and a column bit line. The NAND architecture floating gate memory array is then accessed by a row decoder activating a row of floating gate memory cells by selecting the word select line connected to their gates. In addition, the word lines connected to the gates of the unselected memory cells of each string are also driven. However, the unselected memory cells of each string are typically driven by a higher gate voltage so as to operate them as pass transistors and allowing them to pass current in a manner that is unrestricted by their stored data values. Current then flows from the source line to the column bit line through each floating gate memory cell of the series connected string, restricted only by the memory cells of each string that are selected to be read. Thus, the current encoded stored data values of the row of selected memory cells are placed on the column bit lines.

In FIG. 1, each erasable block 116, 118 contains a series of physical pages or rows 120, each page/row containing physical storage for one or more logical sectors or blocks 124 (shown here for illustration purposes as a single logical sector/block 124 per physical page/row 120) that contain a user data space and a control/overhead data space. The overhead data space contains overhead information for operation of the logical block 124, such as an error correction code (not shown), status flags, or an erasable block management data field area (not shown). The user data space in each logical block 124 is typically 512 bytes long. It is noted that other interfaces (not shown) to the Flash memory device 104 and formats for the erasable blocks 116, 118, physical pages 120, and logical sectors/blocks 124 are possible and should be apparent to those of ordinary skill in the art. It is also noted that additional Flash memory devices 104 may be incorporated into the system 100 as required.

Figure 2A:
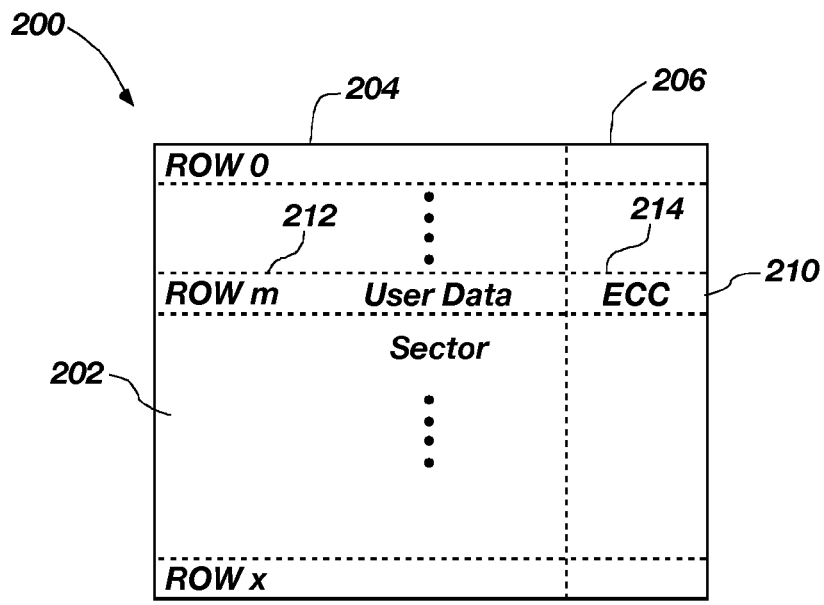
FIGS. 2A and 2B illustrate encoding of user data into blocks and sectors in a non-volatile memory array, in accordance with various embodiments of the present invention.
Figure 2B:
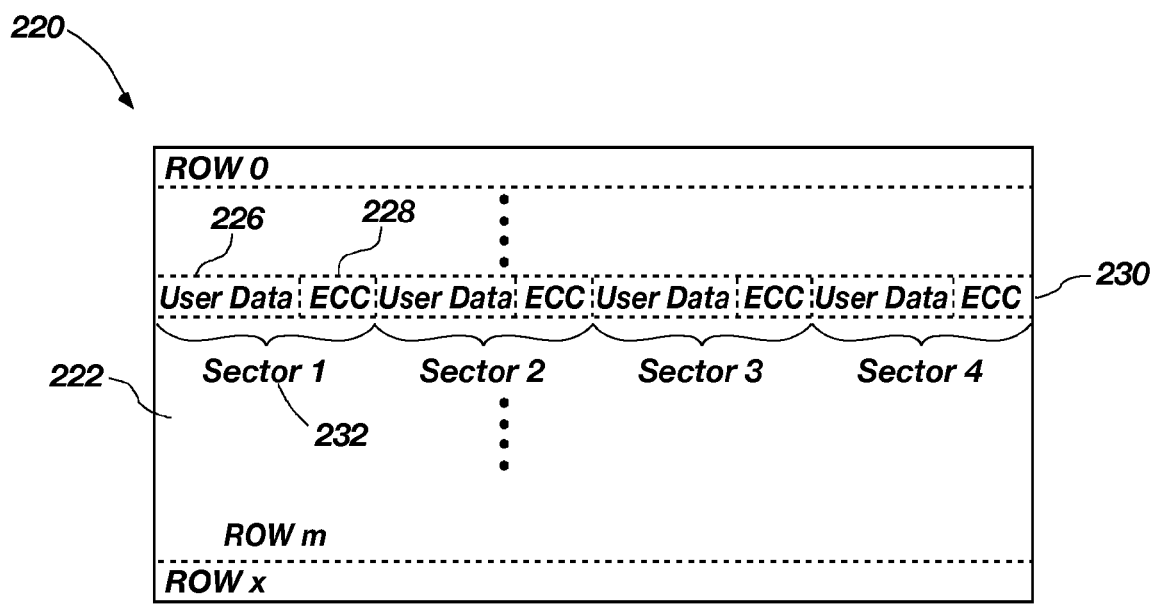

FIGS. 2A and 2B detail encoding 200, 220 of user data into sector/logical blocks of a Flash memory array. In FIG. 2A, user data 212 and header/overhead data 214 are shown in a memory array 202, which includes erasable blocks 116, 118 (FIG. 1), where a single 512-byte logical block is encoded in each physical page/row 210 of the memory array 202. The memory array 202 contains a series of pages/rows 210, each row containing a logical block having a user data area 204 and an overhead data area 206.

In FIG. 2B, user data 226 and header/overhead data 228 are shown in a memory array 222, which includes erasable blocks 116, 118 as illustrated in FIG. 1, where multiple logical blocks 232 are encoded in each physical page/row 230 of the memory array 222. As stated above, many memories support multiple logical sectors or logical block 232 within a single physical page/row 230. In particular, NAND architecture Flash memories typically utilize this approach due to their generally higher memory cell density and larger page/row sizes. The memory page/row 230 contains multiple logical blocks/sectors 232, each logical block 232 having a user data area 226 and an overhead data/block header section 228.

In the embodiment illustrated in FIG. 2B, the page/row 230 contains 2112 bytes of data (4×512 bytes user data+4×8 bytes ECC+32 bytes for overhead) and is formatted to contain four logical blocks 232 having a user data area 226 of 512-bytes each. The four logical sectors 232 are typically sequentially addressed N, N+1, N+2, and N+3, where N is a base logical sector address for the page/row 230. It is noted that the pages/rows 210 and 230 of FIGS. 2A and 2B are for illustration purposes and that other page/row sector formats of differing data sizes, numbers of logical blocks/sectors, and relative positioning of sectors are possible.

As stated above, in an erasable block based non-volatile memory, the memory array is divided into a plurality of individually erasable groups of memory cells called erasable blocks, which are each typically further divided into a plurality of 512-byte physical blocks. Before use, the non-volatile memory is formatted to conform to the data structures and management data fields/tables of the file system or memory structure being represented. Each physical block of the memory array also may contain a header or overhead data area that typically includes various data used in the management of the physical block. This management data can include such items as the status of the physical block (valid, erased/available, or to be erased/invalid) and an error correction code (ECC) for the data of the logical block. In addition, the header typically also includes an identifier that identifies the logical block address for the physical block.

As previously stated, the translation layer in conjunction with the erasable block management (not shown) manages the storage of logical blocks in non-volatile memory devices or a non-volatile memory subsystem. The client of a translation layer is typically the file system or operating system of an associated host system or processor. The translation layer (not shown) allows the non-volatile memory to appear as a freely rewriteable device or magnetic disk/hard drive, allowing the client to read and write logical blocks to the non-volatile memory.

Figure 3:
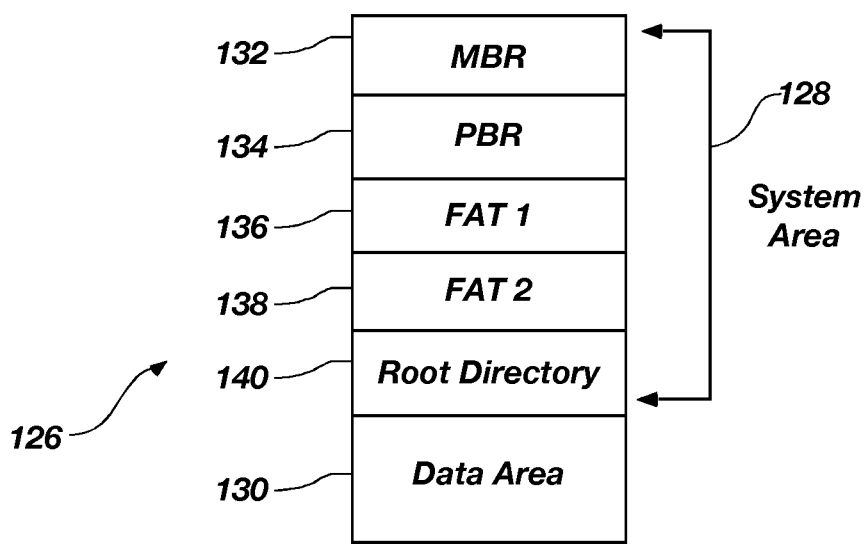
FIG. 3 is a memory map of a non-volatile memory array partitioned according to a file system, in accordance with various embodiments of the present invention.

FIG. 3 is a memory map of a Flash memory array partitioned according to a file system, in accordance with one or more of the various embodiments of the present invention. In FIG. 3, a Flash memory array may be partitioned into one or more partitions. For clarity, a single partition 126 is illustrated and includes a system area 128 and a data area 130. System area 128 has various segments including, for example, the master boot record ("MBR") area 132, partition boot record ("PBR") area 134, FAT1 area 136, FAT2 area 138 and root directory area 140.

MBR area 132 stores overall partition information, including instructions to jump from MBR area 132 to PBR area 134 if the media is a bootable device. MBR area 132 may also include a hidden area that is a reserved space (not shown) between MBR area 132 and PBR area 134.

PBR area 134 includes partition/boot information for a partition. For example, PBR area 134 includes information for the type of FAT (e.g., FAT12/16/32 bits depending on the FAT standard implemented, such as, respectively, FAT12, FAT16 or FAT32) a label (i.e., name of the drive), size of the drive; cluster size (i.e., the number of sectors per allocation unit) number of FAT areas (e.g., FAT 1 area and FAT 2 area) and the number of sectors per FAT.

FAT1 and FAT2 areas 136, 138 contain cluster information for each file. For example, in a FAT12 file system, each entry in FAT1 and FAT2 areas 136 and 138 contains 12 bits and there are a total of 4096 entries. Clusters 0 and 1 are reserved for 0xFFFFF8 (for media type) and End of Cluster. A particular cluster (e.g., cluster 4087) is used to indicate bad clusters. For example, in a FAT16 file system, each entry contains 16 bits and, for example, in a FAT32 file system, each entry contains 32 bits.

Root directory area 140 contains entries for each file. Each directory entry includes a certain number of bytes for file name or directory (e.g., 8 bytes), a number of bytes for extension (e.g., 3 bytes), a number of bytes (e.g., 1 byte) for file attributes (e.g., if a file is read only, hidden, system file, volume label, directory or modified), a number of bytes indicating the time and date when a file was created, a certain number of bytes (e.g., 2) for a starting cluster, and a certain number of bytes (e.g., 4) indicating the file length.

The number of bytes for the starting cluster points to the first cluster in the FAT and the last cluster may be indicated by 0xFFF, 0xFFFF or 0xFFFFFF. In order to write a file name in the directory, the host system finds free cluster space in FAT1 area 136 and data is written in data area 130, including erasable blocks 116, 118 (FIG. 1). Entries in both the FAT1 area 136 and the FAT2 area 138 are then updated. The directory entry (e.g., the date/time/starting cluster/file length) is also updated.

As stated, the root directory area 140 is a table of, for example, 32-byte entries that each set forth certain attributes of a file. Typically, each directory entry making up the root directory in the root directory area 140 includes a file name, a file extension, attribute flags, time and date stamps for the file, the starting cluster number for the clusters that make up the file, and the file size.

Each file on the Flash memory device 104 (FIG. 1) is made up of one or more clusters. The file allocation table (FAT) located in the FAT1 and FAT2 areas 136, 138 contains a record in the form of a chain identifying how the clusters making up the file are linked together. A typical FAT contains a list of two-byte entries, one for each cluster. For some prior FATs, the FAT entries are longer than two bytes. The length of each FAT entry depends upon the total number of clusters. The directory entry in the root directory area 140 for a file contains the starting cluster number for that file, and the host system, such as processor 102 of FIG. 1, uses that starting cluster number to access the FAT. Each FAT entry is a pointer to the next cluster of the file. Thus, the FAT entry retrieved by a first access contains the cluster number of the next cluster making up the file. The host system, such as processor 102 of FIG. 1, uses that next cluster number to access the FAT to retrieve yet another cluster number, and continues this process until the end of the file is reached.

When a file is being written or programmed into Flash memory array 108 (FIG. 1), there exists an opportunity for the power to the memory device to be interrupted, resulting in an incomplete record of the chain of clusters identifying the file. While such interruptions may be reduced by physical locks or other preventive mechanisms, such mechanisms defeat the desirable portability and ease of configurability of Flash memory devices. The various embodiments of the present invention provide a mechanism to reduce the window of opportunity for creating errors in the chain of cluster as recorded in the FAT during an update or edit to an existing file.

Figure 4:
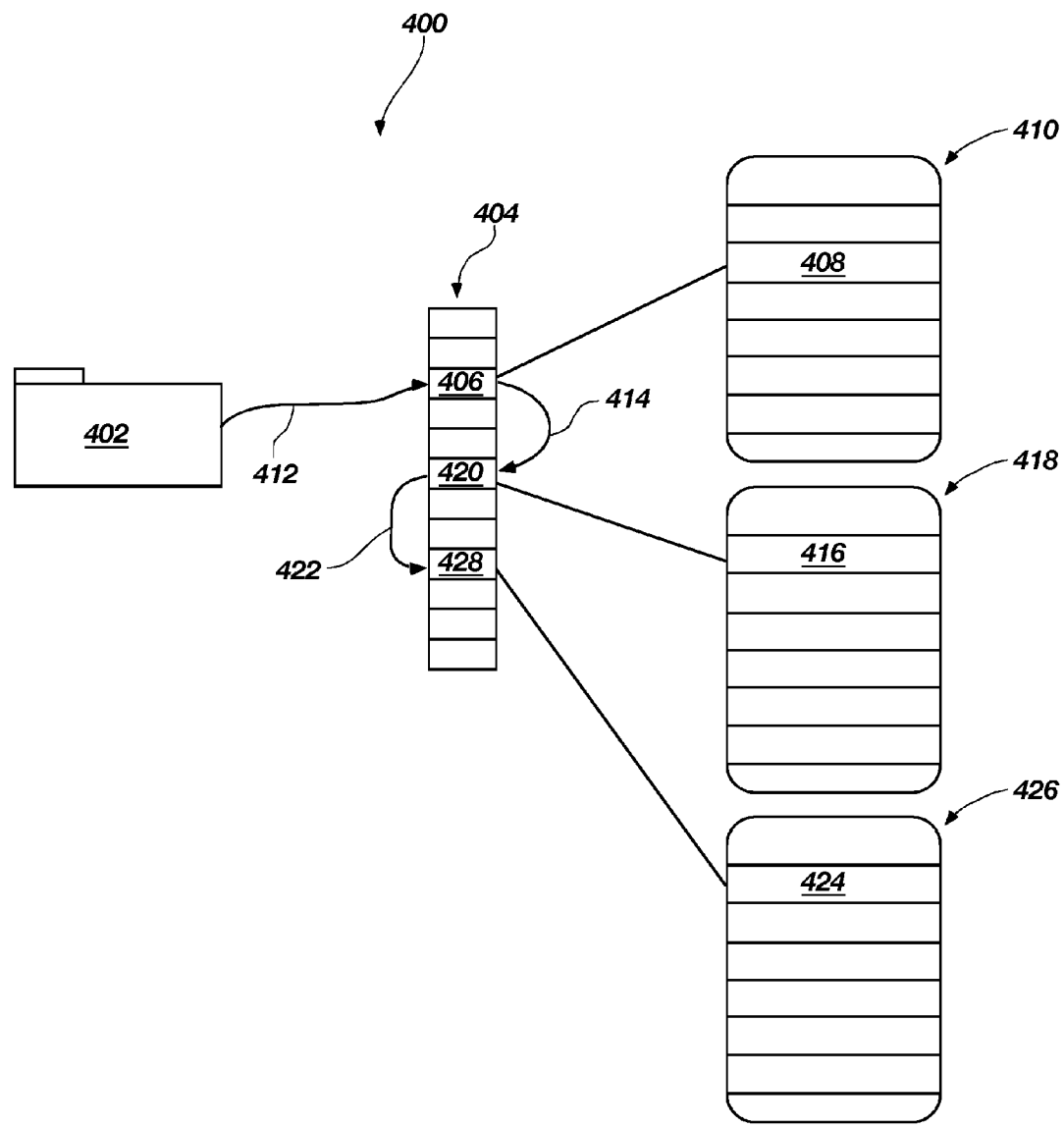
FIG. 4 illustrates storage of an existing file stored in a file system.
Figure 5:
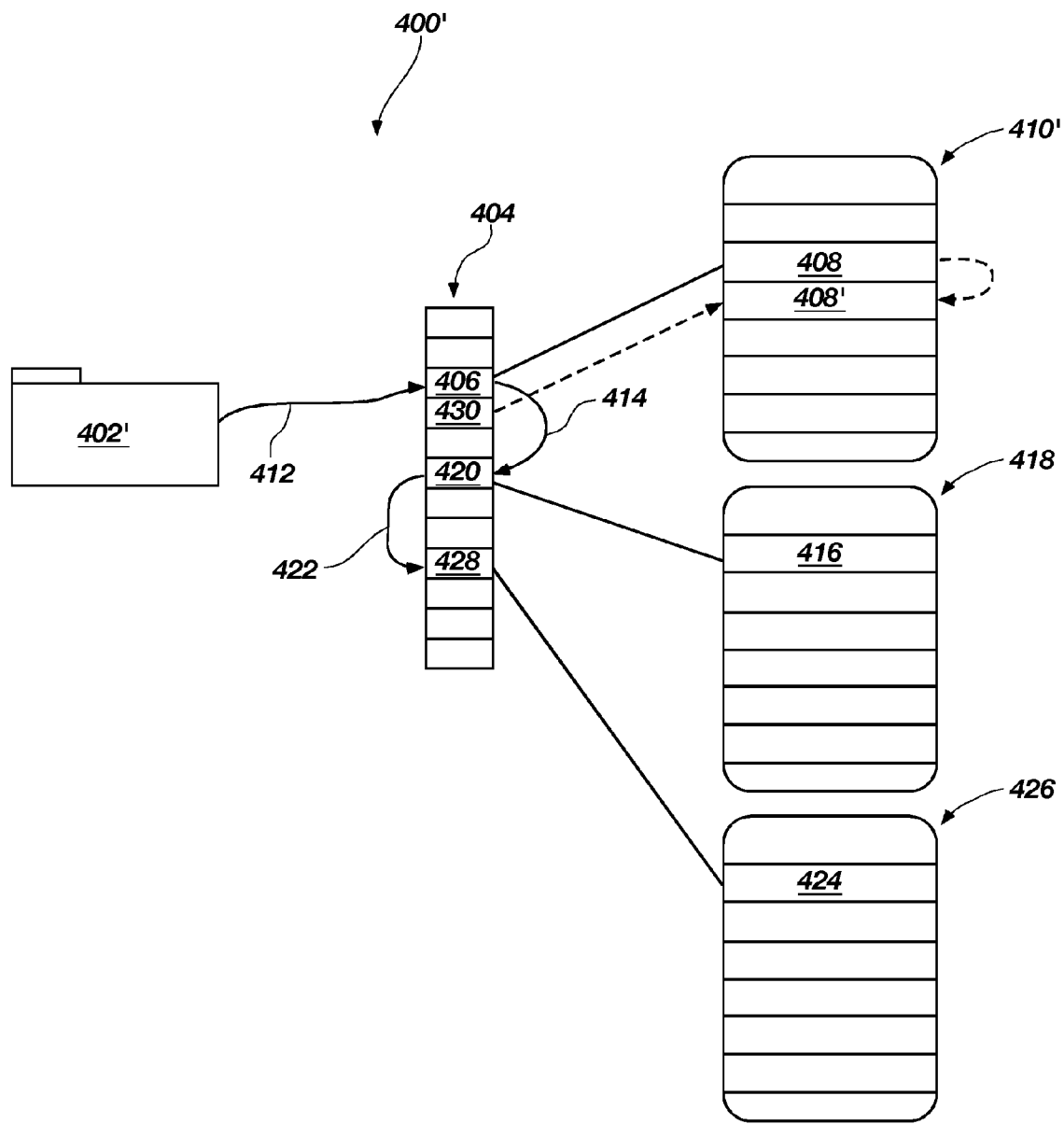
FIG. 5 illustrates editing of an existing file in a file system.

FIGS. 4 and 5 illustrate an edit to an existing file in accordance with a file system. FIG. 4 illustrates an existing file 402 stored in a file system 400. As stated, an indicia of an existing file 402 is stored in the root directory area 140 of the system area 128 as described with respect to FIG. 3. Included in the root directory area 140 may be a file name, a file extension, attribute flags, time and date stamps for the file, the file size, and the starting cluster number or pointer 412 for the clusters that make up the file 402.

A location 406 in the FAT 404 is pointed to by the root directory entry for the file 402. Location 406 corresponds to a cluster sector page 408 (used herein interchangeably depending upon the specific defined structure of the file system 400) of erasable block 410. Location 406 in the FAT 404 further includes a next cluster number or pointer 414, which corresponds, by way of example, to cluster 416 of erasable block 418.

A location 420 in the FAT 404 is pointed to by the next cluster number or pointer 414 for the file 402. Location 420 corresponds to a cluster 416 of erasable block 418. Location 420 in the FAT 404 further includes a next cluster number or pointer 422, which corresponds, by way of example, to cluster 424 of erasable block 426. A location 428 in the FAT 404 includes an end-of-file indicator indicating that no more clusters are to be included in the file 402. As illustrated, file 402 includes clusters 408, 416, 424 from, for example, the respective erasable blocks 410, 418, 426.

FIG. 5 illustrates an edit or update occurring to a file, illustrated as edited file 402'. It is recalled that the clusters or pages of the non-volatile memories as described herein are not rewriteable until the entire erasable block has been reclaimed by erasing or resetting the non-volatile memory cells within the block. Accordingly, FIG. 5 illustrates an edit to cluster 408 in file system 400', which is rewritten at a new location in the Flash memory array as cluster 408' in the erasable block 410'. It is noted that the edited file 402' is correctly composed of clusters 408', 416, 424; however, FAT 404 has not yet been updated by redirecting starting cluster or pointer number 412 from pointing to location 406 to location 430 to reflect the relocation of amended cluster 408' in erasable block 410'. If power to the memory device is interrupted prior to the completion of the change to the FAT, the edited file 402' may become corrupt and unusable.

Figure 6A:
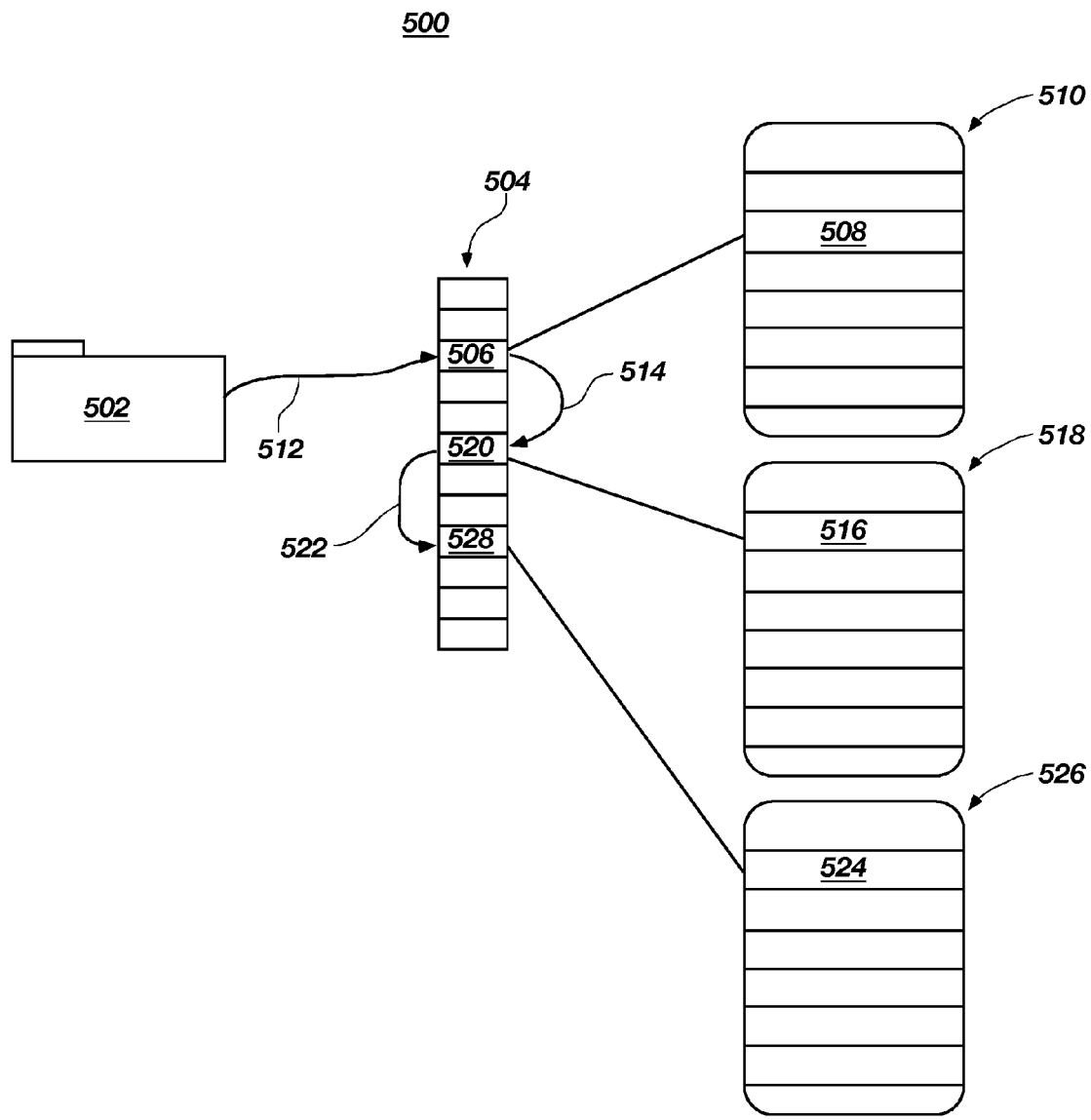
FIGS. 6A-6D illustrate editing of an existing file in a file system, in accordance with an embodiment of the present invention.

FIGS. 6A-6D illustrate an editing process of a file in a Flash memory device, in accordance with an embodiment of the present invention. FIG. 6A illustrates an edit to an existing file in a file system. An existing file 502 is stored in a file system 500. As stated, an indicia of an existing file 502 is stored in the root directory area 140 of the system area 128 as described with respect to FIG. 3. Included in the root directory area 140 may be a file name, a file extension, attribute flags, time and date stamps for the file, the file size, and the starting cluster number or pointer 512 for the clusters that make up the file 502.

A location 506 in the FAT 504 is pointed to by the root directory entry for the file 502. Location 506 corresponds to a cluster sector page 508 (used herein interchangeably depending upon the specific defined structure of the file system 500) of erasable block 510. Location 506 in the FAT 504 further includes a next cluster number or pointer 514, which corresponds, by way of example, to cluster 516 of erasable block 518.

A location 520 in the FAT 504 is pointed to by the next cluster number or pointer 514 for the file 502. Location 520 corresponds to a cluster 516 of erasable block 518. Location 520 in the FAT 504 further includes a next cluster number or pointer 522, which corresponds, by way of example, to cluster 524 of erasable block 526. A location 528 in the FAT 504 includes the last cluster in response to the end of the file 502. As illustrated, file 502 includes clusters 508, 516, 524 from, for example, the respective erasable blocks 510, 518, 526.

Figure 6B:
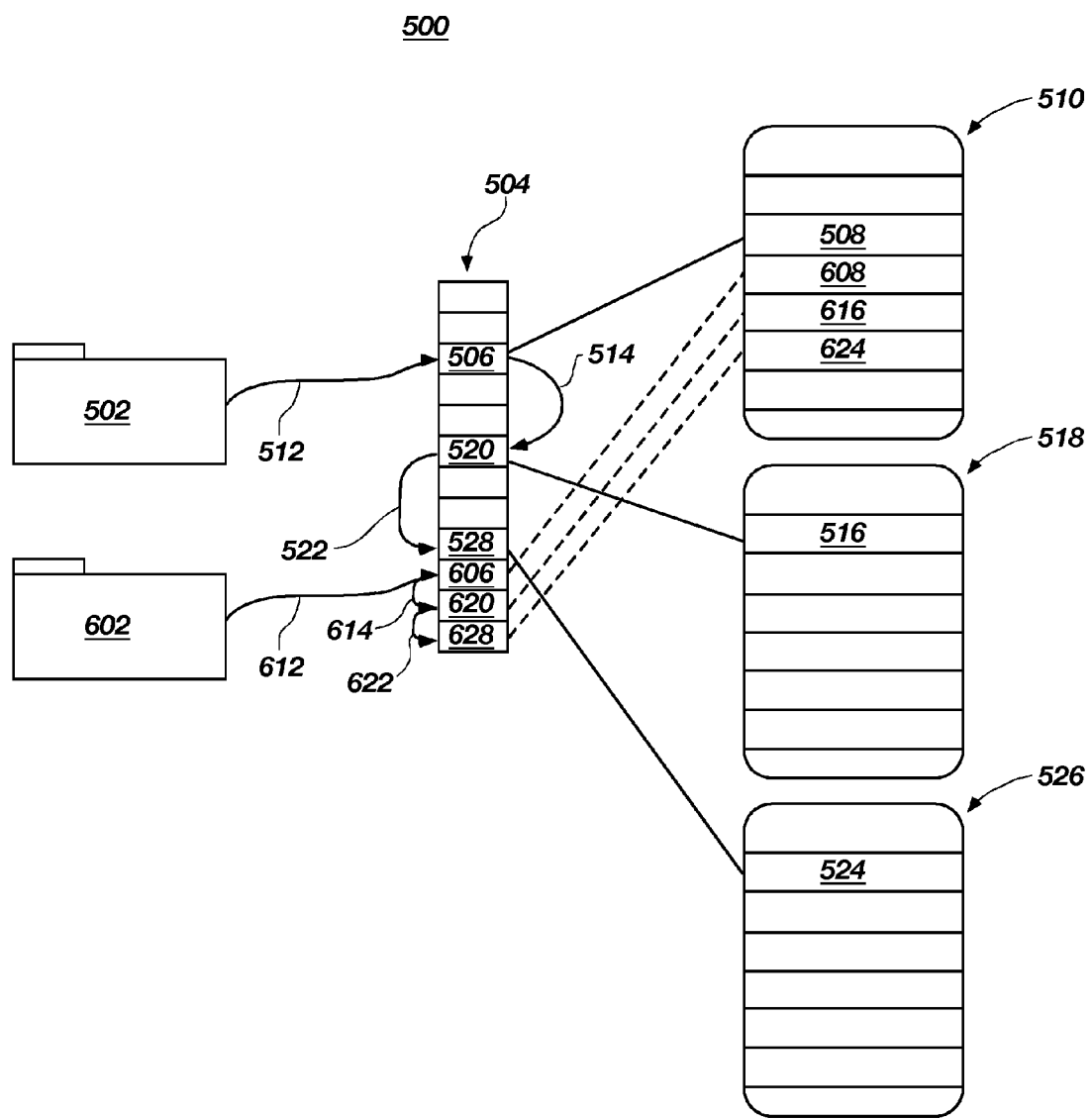

FIG. 6B illustrates a further act in the editing of a file, in accordance with an embodiment of the present invention. A file copy 602 of existing file 502 to be edited is created leaving the original unedited file 502 and the corresponding respective FAT entries intact during the editing process. The file copy 602 is stored in a file system 500. A location 606 in the FAT 504 is pointed to by a starting cluster or number 612 for the file copy 602. Location 606 corresponds to a cluster sector page 608 of erasable block 510. Location 606 in the FAT 504 further includes a next cluster number or pointer 614, which corresponds, by way of example, to cluster 616 of erasable block 510.

A location 620 in the FAT 504 is pointed to by the next cluster number or pointer 614 for the file copy 602. Location 620 corresponds to a cluster 616 of erasable block 510. Location 620 in the FAT 504 further includes a next cluster number or pointer 622, which corresponds, by way of example, to cluster 624 of erasable block 510. A location 628 in the FAT 504 includes an end-of-file indicator indicating that no more clusters are to be included in the file copy 602. As illustrated, file copy 602 includes clusters 608, 616, 624 from, for example, the erasable block 510. It should be noted that the locations of the clusters within specific erasable blocks is merely illustrative and other arrangements are also contemplated.

Figure 6C:
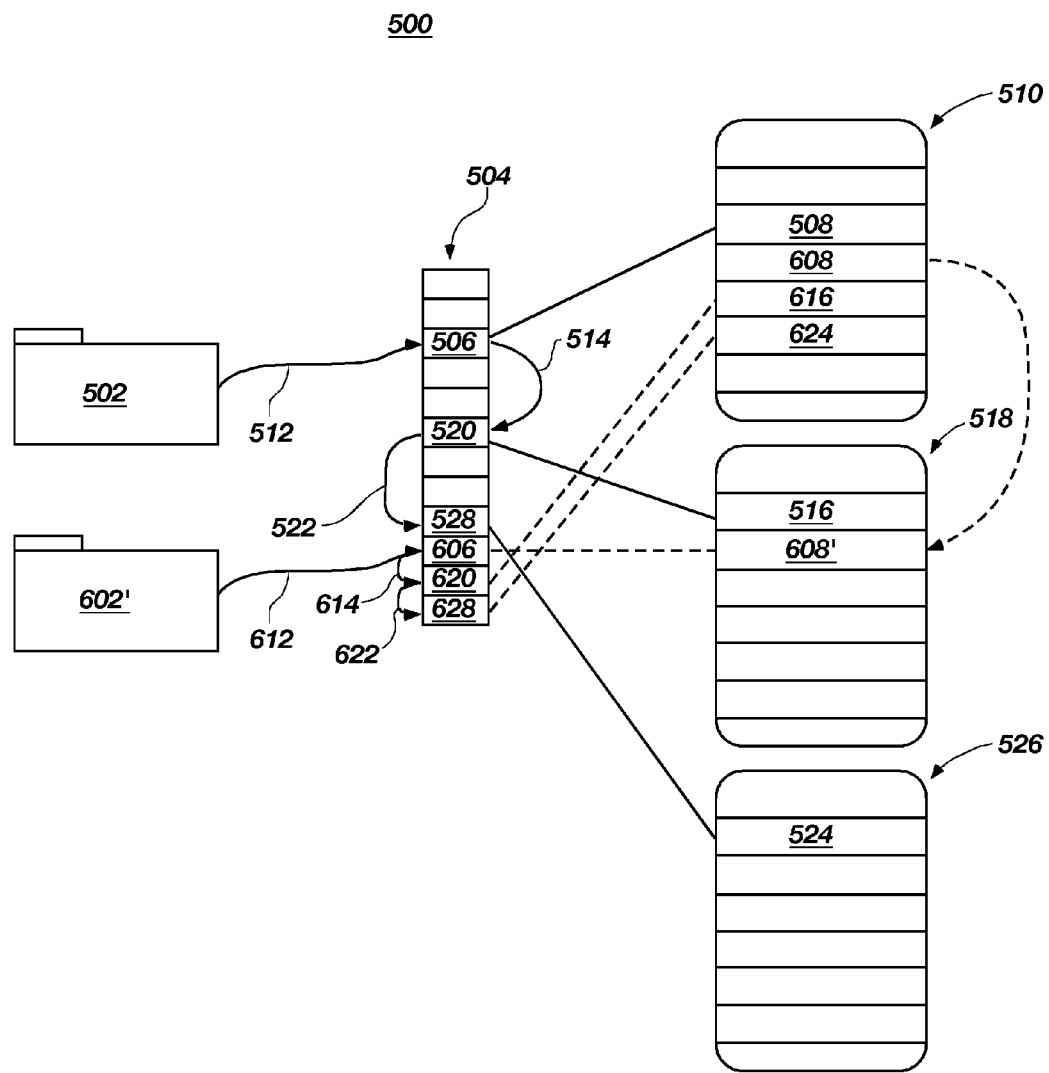
Figure 6D:
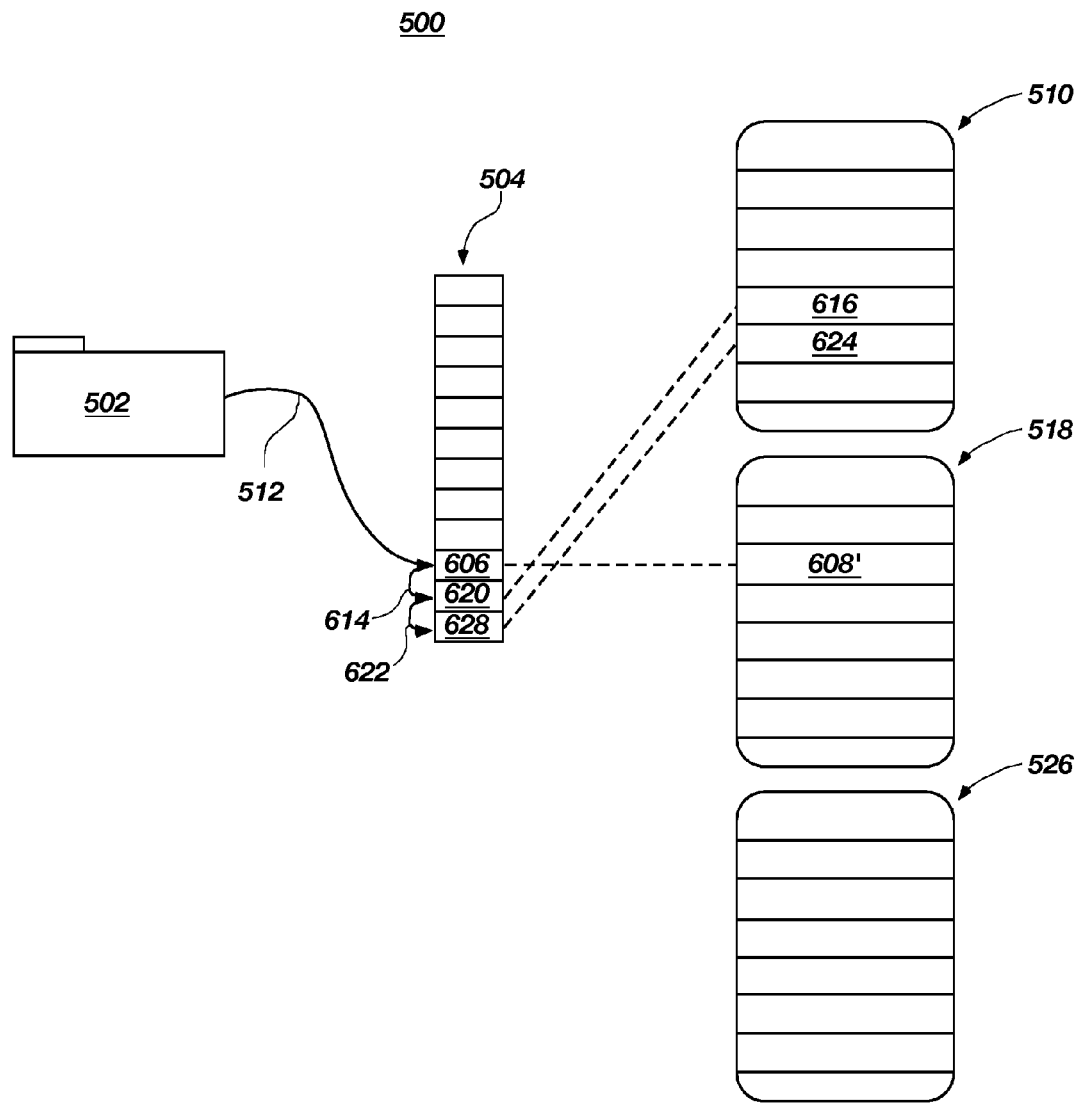

FIG. 6C illustrates a further act in the editing of a file, in accordance with an embodiment of the present invention. During the file editing process, the edits are performed on the file copy 602. As previously described, the clusters or pages of the non-volatile memories as described herein are not rewriteable until the entire erasable block has been reclaimed by erasing or resetting the non-volatile memory cells within the block. During the editing process, one or more of the clusters 608, 616, 624 associated with the file copy are altered. By way of illustration, the data in a cluster 608, which is the copy of cluster 508, is subjected to alterations. The altered data is written into cluster 608' in the erasable block 518. It is noted that the edited file copy 602' is correctly composed of clusters 608', 616, 624.

As noted previously, one of the vulnerabilities of editing files in Flash memory devices is the untimely interruption of power to the memory device prior to all of the entries in the file allocation table being correctly written or prior to all of the clusters associated with the edited file being correctly written into the Flash memory array. With reference to the editing process described to this point as described with reference to FIGS. 6A-6C, the occurrence of a power interruption during either the creation of the file copy 602, or the editing of data stored in cluster 608', or the reassociation of the location (e.g., location 606 from cluster 608 to cluster 608') of the next cluster in the file allocation table, would not result in the corruption of the original file 502 even though the edits may have been lost.

The various embodiments of the present invention narrow the window of vulnerability of the files being corrupted during inadvertent power interruption by performing the editing on a copy of the original file while maintaining the root directory and FAT pointing to the original file in the Flash memory array. Should power interruption occur in any of these states, the original file remains uncorrupted on power up.

As a further act in the editing process in accordance with the various embodiments of the present invention, the starting cluster number or pointer 512 in the root directory entry for file 502 is reconfigured to point to location 606 in the FAT 504. The window of vulnerability of corruption of a file stored in the Flash memory array has, thus, been greatly narrowed down to power interruption occurring during the reconfiguration of the addressing of the single starting cluster in the root directory rather than during either the writing of data into clusters in the Flash memory array or the updating of the FAT.

The processes and devices described above illustrate embodiments of methods and devices out of many that may be used and produced according to the present invention. The above description and drawings illustrate embodiments that provide significant features and advantages of the present invention. It is not intended, however, that the present invention be strictly limited to the above-described and illustrated embodiments.

Although the present invention has been shown and described with reference to particular embodiments, various additions, deletions and modifications that will be apparent to a person of ordinary skill in the art to which the invention pertains, even if not shown or specifically described herein, are deemed to lie within the scope of the invention as encompassed by the following claims.

What is claimed is:

1. A method of modifying data in a memory device, comprising:
    generating a modified file copy of an existing file within a file system of a memory device, the existing file having a first starting pointer associated therewith pointing to a first entry of a file allocation table, the modified file copy having a second starting pointer associated therewith pointing to a second entry of a file allocation table, wherein the first entry corresponds to data of the existing file, and the second entry corresponds to data of the modified file copy, and wherein the second starting pointer is generated regardless of whether the data of the modified file copy corresponding to the second entry is modified; and
    reassociating the first starting pointer of the existing file to point to the second entry after completion of generating the modified file copy.

2. The method of claim 1, wherein the first entry of a file allocation table and the second entry of a file allocation table are located within a single file allocation table.

3. The method of claim 2, wherein the single file allocation table includes additional entries corresponding to additional data of the existing file and the modified file copy.

4. The method of claim 1, wherein generating the modified file copy includes creating a file copy and modifying the file copy.

5. The method of claim 4, wherein creating the file copy includes copying data clusters of the existing file and generating a new data cluster for each data cluster copied from the existing file.

6. The method of claim 5, wherein modifying the file copy includes at least one of editing, writing, programming, erasing, and resetting data in the file copy.

7. A method of modifying a file of a memory device, the method comprising:
    generating a modified file copy of an existing file within a memory device, the existing file having a first starting pointer to a first location of a file allocation table corresponding to an initial data of the existing file, the modified file copy having a second starting pointer to a second location of a file allocation table corresponding to an initial data of the modified file copy; and
    reassociating the first starting pointer to point to the second location while maintaining the second starting pointer to point to the second location at least until the first starting pointer has been reassociated to point to the second location regardless of whether the initial data of the modified file copy is modified.

8. The method of claim 7, wherein generating the modified file copy includes modifying a previously unmodified file copy of the existing file while the second starting pointer is being maintained to point to the second location, and prior to the first starting pointer being reassociated to the second location.

9. An apparatus, comprising:
    a memory array partitioned according to a file system; and
    a controller operably coupled to the memory array, the controller configured to:
        generate a modified file copy of an existing file;
        reassociate a first starting pointer from pointing to a first location of a file allocation table of the file system to point to a second location of a file allocation table after the modified file copy has been generated, wherein the first location corresponds to an initial data of the existing file, and the second location corresponds to an initial data of the modified file copy; and
        maintain a second starting pointer to point to the second location prior to the first starting pointer being reassociated to point to the second location regardless of whether the initial data of the modified file copy is modified.

10. The apparatus of claim 9, wherein each partition of the memory array includes a system area and a data area.

11. The apparatus of claim 10, wherein the system area includes a plurality of segments including a root directory area and a file allocation table area.

12. The apparatus of claim 11, wherein the file allocation table area includes a single file allocation table that includes the first location and the second location.

13. The apparatus of claim 12, wherein the first location and the second location each include a next pointer to a next location of the single file allocation table.

14. The apparatus of claim 11, wherein the first starting pointer and the second starting pointer are stored in the root directory area.

15. The apparatus of claim 11, wherein the file allocation table area includes:
    a first record identifying how the clusters making up the existing file are linked together; and
    a second record identifying how the clusters making up the modified file copy are linked together.

16. The apparatus of claim 9, wherein the controller includes a control state machine.

17. The apparatus of claim 9, wherein the memory array is a Flash memory array.

18. The apparatus of claim 9, further comprising:
a memory device comprising the memory array and the controller; and
a host system operably coupled to the memory device, the host system configured to access the memory array to retrieve the data of the files of the file system.

19. The apparatus of claim 18, wherein the host system includes a processor.

20. The apparatus of claim 9, wherein the data includes at least one of a cluster, a sector, and a page according to a defined structure of the file system.

* * * * *